United States Patent [19]

Eriksson

[11] Patent Number: 5,446,990
[45] Date of Patent: Sep. 5, 1995

[54] CASE FOR FISHING TACKLES WITH ATTACHMENT FOR IT AND METHOD TO USE IT

[76] Inventor: Bertil Eriksson, S-803 46, Gävle, Sweden

[21] Appl. No.: 78,174

[22] PCT Filed: Dec. 16, 1991

[86] PCT No.: PCT/SE91/00863
§ 371 Date: Oct. 22, 1993
§ 102(e) Date: Oct. 22, 1993

[87] PCT Pub. No.: WO92/10931
PCT Pub. Date: Jul. 9, 1992

[30] Foreign Application Priority Data
Dec. 17, 1990 [SE] Sweden .................. 9004016

[51] Int. Cl.⁶ .......................................... A01K 87/00
[52] U.S. Cl. .................................. 43/25.2; 43/57.1
[58] Field of Search ................. 43/25, 25.2, 54.1, 57.1, 43/57.2; 206/315.11

[56] References Cited

U.S. PATENT DOCUMENTS

| | | | |
|---|---|---|---|
| 1,251,221 | 12/1917 | Greenwald | 43/25 |
| 2,699,623 | 1/1955 | Pragalz | 43/25.2 |
| 2,767,502 | 10/1956 | Reynolds | 43/25.2 |
| 3,370,236 | 2/1968 | Walker | 224/253 |
| 5,199,208 | 4/1993 | Matchette | 43/25.2 |

FOREIGN PATENT DOCUMENTS

| | | | |
|---|---|---|---|
| 0257263 | 9/1967 | Austria | 43/25 |
| 0713404 | 8/1954 | United Kingdom | 43/57.1 |

Primary Examiner—P. Austin Bradley
Assistant Examiner—James Miner
Attorney, Agent, or Firm—Cushman, Darby & Cushman

[57] ABSTRACT

A fishing lure box is disclosed which can be mounted in a fixed position on a fishing rod, but which can be easily separated therefrom. The lure box is removably attached to an attachment device which is fixed to the fishing rod, especially by a convenient sliding action along a rod segment or along a beam portion having an engaging flange.

5 Claims, 2 Drawing Sheets

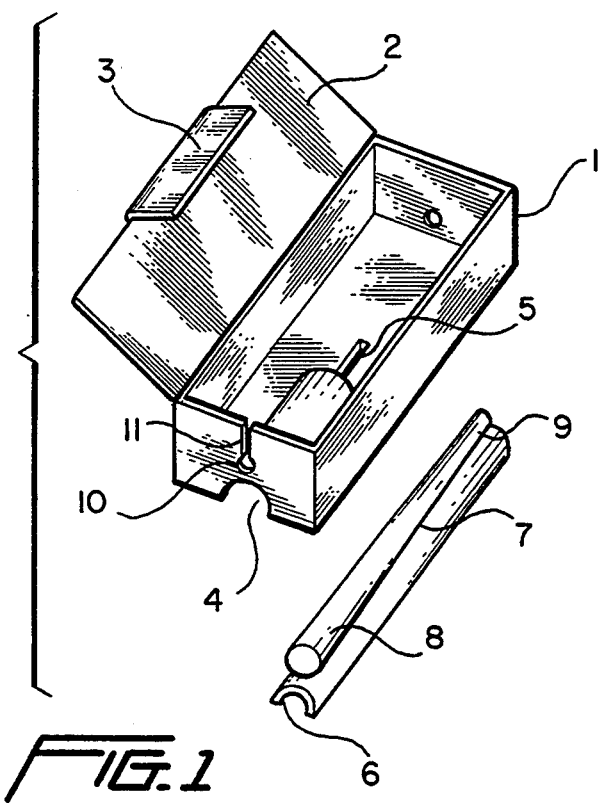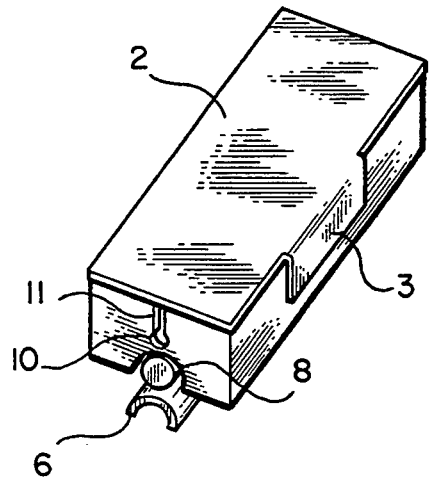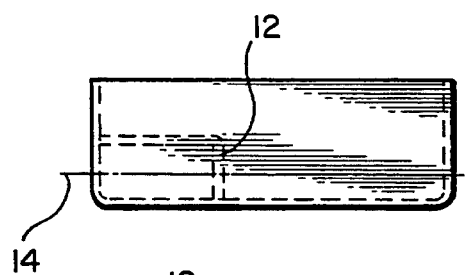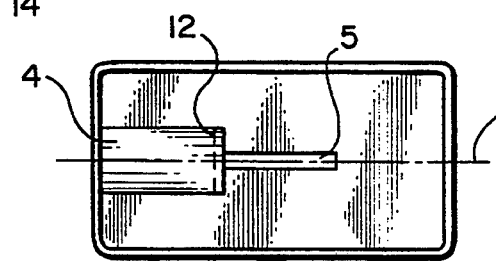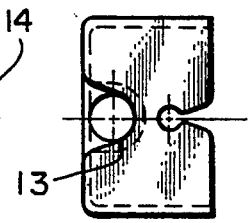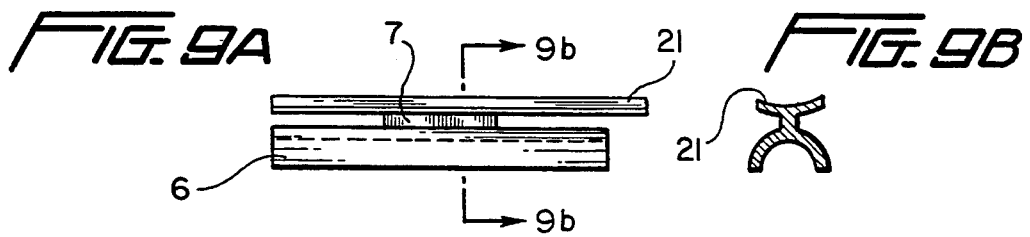

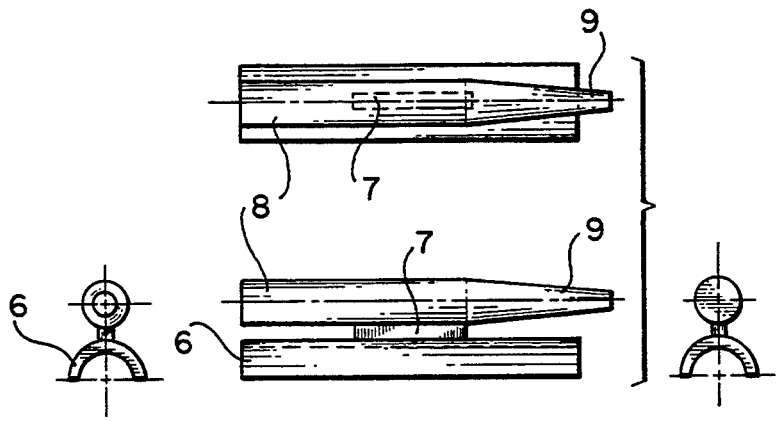
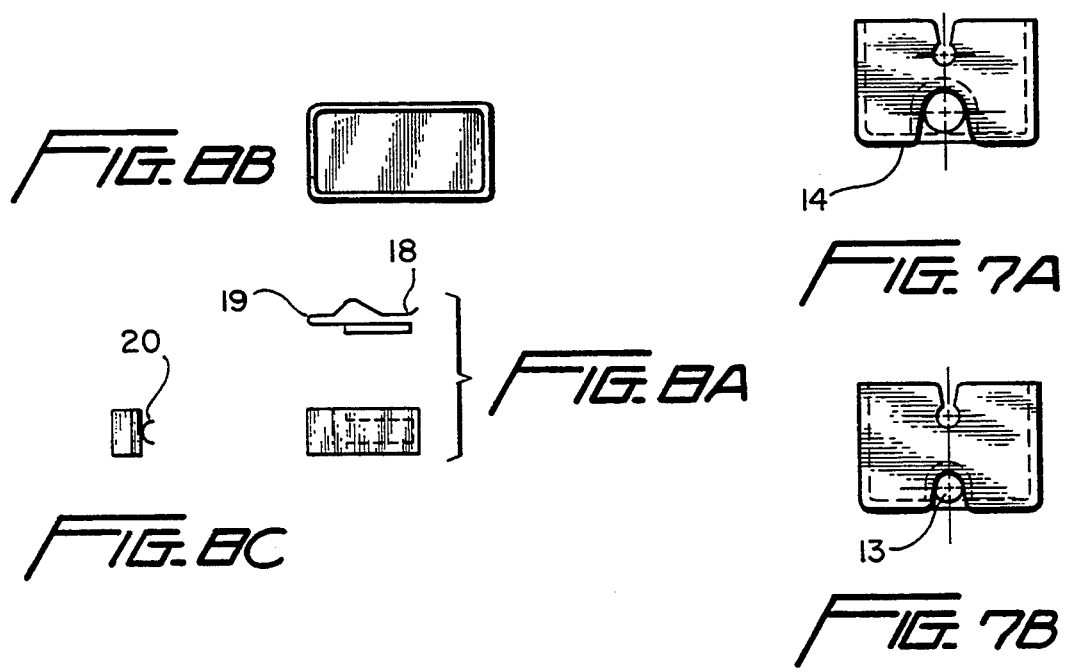
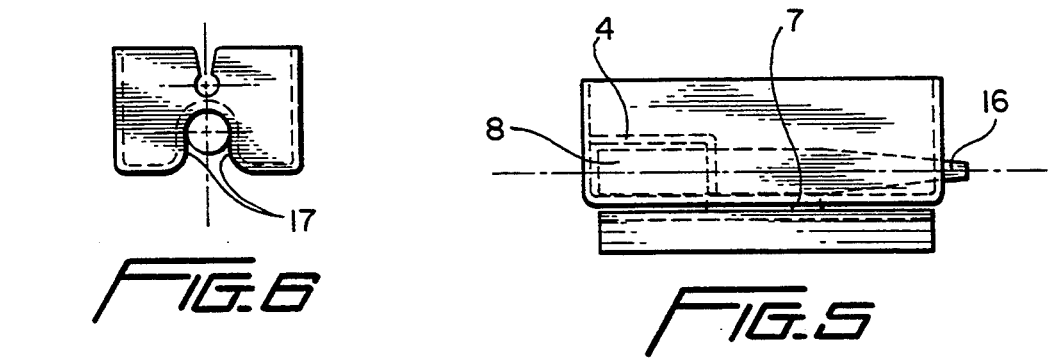

CASE FOR FISHING TACKLES WITH ATTACHMENT FOR IT AND METHOD TO USE IT

BACKGROUND OF THE INVENTION

An angler, who may be walking from lake to lake, usually desires to keep his gear organized and ready for use when he reaches the waterfront. Many anglers keep their lures attached to the line of their fishing rod. This can cause trouble, if, for example, a lure comes loose from the rod. Also, when the fishing rod is transported, lures can tangle with each other and/or the fishing line. This, of course, can be inconvenient and highly irritating for the fisherman.

With the present invention, a fisherman can store his lures or bait in a way that prevents them from coming loose and get entangled.

At the same time, manufacturers of fishing lures can pack their products in a useful carrying box, that might be of value for anglers.

SUMMARY OF THE INVENTION

The presently claimed can be taken off or fastened to a fishing rod or pole with a simple action. To accomplish this, the bottom of the lure box has such a shape, that it fits an attachment which is glued or taped on the rod.

The lure box also has a cover, which may be hinged on the box. In the gable of the box there is a opening so, that a line or a trace can enter. Other holes could also be needed so that lures or line held therein do not rust or rot.

Part of the attachment device for attaching the lure box is designed to be led into the box or matching openings in the bottom of the box so, that the lure box becomes fastened to the rod. Corresponding passages are thus made in the box in one of the gables and/or along the bottom of the box. Some kind of arrangement us provided to align the lure box in parallel to the rod.

In an advantageous design, a stick portion fastened to the rod is used to engage the lure box in parallel with the rod portion can extend along the whole lure box and provides a good parallel alignment with the rod. The lure box is engaged to stick portion by slidingly inserting a pointed end of the stick portion into the outer bottom part of the lure box, such as into a groove formed therein.

For the alignment of the box along the attachment device, some kind of grooves or slits in the box are needed. If there a penetration of the box from one gable to be used, grooves or slits are made on the inside of the box's bottom. Dovetail slots or the like can instead be found on the outside of the box's bottom if the attachment device has corresponding fitting flanges.

In addition, there might be some kind of blocking arrangement to prevent the box from slipping off the attachment.

BRIEF DESCRIPTION OF THE DRAWINGS

A box is shown schematically in perspective in FIG. 1, where the box is disconnected from its attachment device on the rod. The lid of the box is closed, and the attachment device is put in place in FIG. 2.

FIG. 3 is an exploded drawing of the box.

FIG. 4 shows one kind of attachment device with a stick segment.

A section of a box mounted on an attachment device is shown in FIG. 5.

One can see some gables of boxes on sticks in FIGS. 6 and 7.

An other design of the attachment device with a modified box is shown in FIG. 8.

Finally a modification of the attachment device in FIG. 4 is shown in FIG. 9.

DETAILED DESCRIPTION OF THE INVENTION

An advantageous design of the invented box for lures and the like is shown with an open lid in FIG. 1. The box 1 has a lid 2. On the latter a locking flap 3 can be seen. There is a rise 4 inwardly formed in the bottom of the box, which rise extends from at least one gable of the box some length along the box. The rise ends with a groove 5. Below the box in FIG. 1, an attachment device to fasten the box 1 to a fishing rod is shown. This attachment device consists of half a cylinder 6, one longitudinal beam 7, and, above the beam 7, a stick or rod 8. The leading part 9 of the stick is conical or otherwise tapered. On the box there is a venthole 10, which over a slit 11 is connected to the brim of the box.

The lid 2 is closed over the box 1 in FIG. 2. The lid 2 is hinged on one of the long sides of the box. This can be performed in many ways; here a hinge is made when manufacturing box as well as lid. This technique is well known by the skilled man.

In FIG. 3, some drawing views (i.e., top view and left, right, and front elevational views) of a box without lid can be seen. According to these views, the depth of the box 1 is relatively small, but this is not characteristic for the invention. The depth of the box can easily be chosen by the skilled man and adapted to a desired volume.

The rise 4 in the bottom of the box 1 is clearly seen in FIG. 3. The groove or slit 5 in the plane part of the bottom is also well displayed. In this figure, the length of the rise 4 and the slit 5 are each approximately equal to a third of the box's length. This length relation is however not fixed for the invention. Men skilled in the art can chose any length relation relative the size of the lures which are to be packed in the box. On some occasions, no rise is used as other designs of attachments come to use. The rise 4 is at least partially defined by a wall 12 with a hole 13 formed at one gable of the box. The width of the hole equals the diameter of the stick 8 with some additional clearance. It has been found that box and stick interrelate well even without the wall 12, but in such cases it is advisable to make the slit 5 considerably longer.

In FIG. 4, the stick 8 attached to that over the beam 7 is fastened on half a circular cylinder 6. The latter is supposed to be fastened on a fishing rod, pole or the like by some known method like tape or glue. The pin 8 ends with a conical part 9 to simplify the mounting of the box on the stick.

The cooperation of the two parts, the stick 8 and the box 1, is shown in FIG. 5, where the stick has been hatched. It can be seen that the height of the beam 7 is a little larger than the thickness of the box's bottom, which gives a secure attachment. The groove or slit 5 in the box is a little longer than the beam 7.

According to the present invention, the beam 7 orients the box 1 along the stick 8. In addition, the conical or pointed part 9 of the stick simplifies the mounting of the box on the attachment device. Men skilled in the art understand that the box 1 should be preferably mounted with the venthole 10 and adjoining slit 11 facing the point of the rod, away from the user. The pointed end of the stick will thus face the casting reel or the handle of the rod.

From this alignment it follows that a lure or bait fastened to a line and stored in the closed box will force the box to stay on the attachment device if the line is pulled taut. Also, during casting, the box will be forced to stay in place by centrifugal forces. Nevertheless, some kind of locking device to anchor the box on the stick may be provided. In FIG. 5, one example of a locking mechanism is shown. The conical part 9 of the stick 8 is long enough to be guided through a hole 14 in the right gable of the box. This part 16 of the stick is clearly shown in FIG. 5.

The locking can, as the skilled individual understands, be performed by other methods like with grooves in the conical stick facing the bottom of the box. Some rises of the bottom might then form a locking device between the box and the stick. The experienced artisan can however find other locking methods, which all are covered by the following claims. The experienced man might also use dovetail slots in the box to form a dovetail joint with the beam of the attachment device. This will give a secure fastening and guidance of the box.

Trials with a rise along the whole of the box's bottom have given some good results, but the box has a tendency to rotate around the rod if the attachment device is not similar to the one described above. This kind of design is shown in FIG. 6. The walls 17 of the rise are parallel. A skilled individual understand that those walls could be produced in a way so, that they should meet on the opposite side of a rod.

In FIG. 7, two views of one box's gable is shown. FIG. 7a is identical with one of the views in FIG. 3. One observes, that the bottom of the box is in contact with the stick. In FIG. 7b the stick is thinner, which makes it possible to lower the rise 4 in the bottom. However, the latter design gives less stability.

The stick 8 shown in FIG. 4, completing the beam 7 of the attachment device and facing the box, can, as skilled users understand, be replaced by, for example, flanges of a beam. This is shown from the side in FIG. 9, where the upper part of FIG. 4 shows the same device from above. The flanges 21 could be made in a dovetail shape matching a dovetail slot in the bottom of the box. The pointed part 9 of this dovetail simplifies the mounting of the box on the attachment device.

Keeping the venthole 10 for a line or trace the box can be fastened on a plane attachment device. This is shown in FIG. 8, which has the same layout as FIGS. 3 and 4. The different views of the box are shown at the top. Here the hole 13 shown in the first box has been transformed into an laterally elongated opening 17. Through this opening, one leg 18 of the attachment device is guided into the box. Preferably now the device has plate-like form with a profile that is shown below the box in FIG. 8. The other leg of the device is, after a short distance below the box, bent to form half a cylinder 20, that, in a known way, may be fastened to a rod. The lid is not shown in this figure either, as it has no other function but to close the box. It is advantageous to produce the box and the lid in the same operation and form them from plastics. The chose of compound is left to the experienced.

The beam with its stick 8 or flanges 21 together with the fastening half cylinder 6 is preferably also manufactured in one operation. Using glue for the fastening process should be considered. The half cylinder 6 also has to be flexible enough so that the attachment device can be used on rods with varying diameters. Other designs of the attachment device will be covered by the following claims.

The dimensions of the box can be chosen by the skilled user considering the size of the lures or baits that are supposed to be packed and used during fishing. Big wobblers need boxes with large volume whereas small spinners or spoons only need boxes of the size, for example, 8×4×4 cm.

The invented box for lures like spinners and wobblers could imply an innovation in the marketing of those products. It is the goal for the inventor that those products by routine shall be packed in this kind of box. With a consistent fixed attachment device on separate rods boxes with different fishing baits should easily be changed on a rod, which simplifies its utility for anglers and fisherman. Good order of gear can be thereby maintained without lures hooking or tangling with each other.

What is claimed is:

1. A fishing lure box which can be mounted on a fishing rod, comprising:
    a box portion having a base and a plurality of walls extending perpendicularly to said base which together define a lure-holding space, said box portion further including a lid portion to close said box portion; and
    an attachment device for attaching the box portion to the fishing rod, said attachment device having a lure box attachment portion and a fishing rod engaging portion adapted to be fixedly attached to the fishing rod, said attachment portion and said engaging portion being connected by a beam portion,
    wherein an exterior portion of said base is provided with means for slidably and detachably engaging said attachment portion to thereby restrain said box portion in a fixed position relative to the fishing rod.

2. A fishing lure box as claimed in claim 1, wherein said attachment portion comprises an elongate rod portion which extends parallel to the fishing rod, wherein said means for engaging said attachment portion comprises a groove formed in said base, said groove having a cross-sectional shape substantially corresponding to said elongate rod portion such that said rod portion is disposed within said groove and said beam portion extends from said elongate rod portion to said fishing rod engaging portion between respective edges of said groove.

3. A fishing lure box as claimed in claim 1, wherein said attachment portion comprises a flange formed along an edge of said beam portion opposite said fishing rod engaging portion, wherein said means for engaging said attachment portion comprises a slot formed in said base which configured to slidably receive said flange.

4. A fishing lure box as claimed in claim 1, wherein said fishing rod engaging portion is a flexible concave member fixedly attached to the fishing rod.

5. A fishing lure box as claimed in claim 1, further including at least one opening in said box portion through which a fishing line can pass into the interior thereof.

* * * * *